US011268696B2

(12) United States Patent
Dillard et al.

(10) Patent No.: US 11,268,696 B2
(45) Date of Patent: Mar. 8, 2022

(54) SLOT COOLED COMBUSTOR

(71) Applicant: United Technologies Corporation, Farmington, CT (US)

(72) Inventors: Gary J. Dillard, Gainesville, FL (US); Assaf Farah, Brossard (CA)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 117 days.

(21) Appl. No.: 16/165,172

(22) Filed: Oct. 19, 2018

(65) Prior Publication Data

US 2020/0124281 A1 Apr. 23, 2020

(51) Int. Cl.
*F23R 3/00* (2006.01)
*F02C 7/18* (2006.01)
(Continued)

(52) U.S. Cl.
CPC ............... *F23R 3/002* (2013.01); *F02C 7/18* (2013.01); *F23R 3/06* (2013.01); *F02K 3/06* (2013.01);
(Continued)

(58) Field of Classification Search
CPC .... F23R 3/002; F23R 3/06; F23R 3/07; F23R 3/60; F23M 5/04
See application file for complete search history.

(56) References Cited

U.S. PATENT DOCUMENTS 4,380,896 A 4/1983 Wiebe
4,567,730 A 2/1986 Scott
(Continued)

FOREIGN PATENT DOCUMENTS

EP 3076078 A1 10/2016
EP 3112755 A1 1/2017
(Continued)

OTHER PUBLICATIONS

The Extended European Search Report for Application No. 19204432.9-1009; Report dated Dec. 13, 2019; Report dated Dec. 20, 2019; 8 pages.
(Continued)

*Primary Examiner* — Scott J Walthour
*Assistant Examiner* — David P. Olynick
(74) *Attorney, Agent, or Firm* — Cantor Colburn LLP

(57) ABSTRACT

A combustor for use in a gas turbine engine comprising: an outward shell; an inward shell located radially inward of the outward shell, the inward shell and the outward shell defining a combustion chamber therebetween; an aft outward panel located proximate the outward shell, the aft outward panel extending from an aft end of the combustion chamber to an outward panel joint; an aft inward panel located proximate the inward shell, the aft inward panel extending from the aft end of the combustion chamber to an inward panel joint; and a forward panel located proximate a forward end of the combustion chamber, the forward panel comprising: an outward wall located proximate the outward shell; an inward wall located proximate the inward shell; and a forward wall located proximate the forward end of the combustion chamber, the forward wall extending from the inward wall to the outward wall.

18 Claims, 6 Drawing Sheets

(51) Int. Cl.
*F23R 3/06* (2006.01)
*F02K 3/06* (2006.01)

(52) U.S. Cl.
CPC ...... *F05D 2230/60* (2013.01); *F05D 2240/35* (2013.01); *F05D 2260/202* (2013.01); *F23R 2900/00017* (2013.01); *F23R 2900/03042* (2013.01)

(56) References Cited

U.S. PATENT DOCUMENTS

| | | | |
|---|---|---|---|
| 4,912,922 A * | 4/1990 | Maclin | F23R 3/002 60/757 |
| 6,408,628 B1 * | 6/2002 | Pidcock | F23R 3/002 60/752 |
| 7,926,278 B2 | 4/2011 | Gerendas et al. | |
| 9,605,550 B2 | 3/2017 | Graves | |
| 9,651,258 B2 | 5/2017 | Graves et al. | |
| 2005/0086945 A1 * | 4/2005 | Tiemann | F23M 5/085 60/800 |
| 2010/0251722 A1 * | 10/2010 | Woolford | F23R 3/002 60/755 |
| 2011/0067402 A1 | 3/2011 | Wiebe et al. | |
| 2012/0099978 A1 * | 4/2012 | Beyer | C23C 30/00 415/197 |
| 2012/0255308 A1 * | 10/2012 | Chandler | F23R 3/002 60/754 |
| 2014/0360196 A1 * | 12/2014 | Graves | F23R 3/007 60/753 |
| 2017/0138597 A1 * | 5/2017 | Freeman | F23M 5/04 |

FOREIGN PATENT DOCUMENTS

| | | | |
|---|---|---|---|
| EP | 3211319 A1 | 8/2017 | |
| EP | 3366998 A1 | 8/2018 | |
| GB | 002298266 A * | 8/1996 | ............ F23R 3/00 |
| WO | 2015050879 A1 | 4/2015 | |

OTHER PUBLICATIONS

EP Office Action for Application No. 19 204 432.9-1009; Office Action dated Dec. 23, 2020; 5 pages.

* cited by examiner

SLOT COOLED COMBUSTOR

BACKGROUND

The subject matter disclosed herein generally relates to gas turbine engines and, more particularly, to a method and apparatus for providing airflow into combustors of gas turbine engines.

In one example, a combustor of a gas turbine engine may be configured and required to burn fuel in a minimum volume. Such configurations may place substantial heat load on the structure of the combustor (e.g., heat shield panels, shells, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields panels.

SUMMARY

According to an embodiment, a combustor for use in a gas turbine engine is provided. The combustor enclosing a combustion chamber having a combustion area. The combustor includes: an outward shell; an inward shell located radially inward of the outward shell, the inward shell and the outward shell defining a combustion chamber therebetween; an aft outward panel located proximate the outward shell, the aft outward panel extending from an aft end of the combustion chamber to an outward panel joint; an aft inward panel located proximate the inward shell, the aft inward panel extending from the aft end of the combustion chamber to an inward panel joint; and a forward panel located proximate a forward end of the combustion chamber, the forward panel including: an outward wall located proximate the outward shell; an inward wall located proximate the inward shell; and a forward wall located proximate the forward end of the combustion chamber, the forward wall extending from the inward wall to the outward wall, wherein the outward wall extends from the forward wall to the outward panel joint and an aft portion of the outward wall overlaps the aft outward panel by a first distance at the outward panel joint, and wherein the inward wall extends from the forward wall to the inward panel joint and an aft portion of the inward wall overlaps the aft inward panel by a second distance at the inward panel joint.

In addition to one or more of the features described above, or as an alternative, further embodiments may include that the aft portion of the outward wall is located radially inward from the aft outward panel.

In addition to one or more of the features described above, or as an alternative, further embodiments may include that the aft portion of the inward wall is located radially outward from the aft inward panel.

In addition to one or more of the features described above, or as an alternative, further embodiments may include that the aft portion of the outward wall is about parallel with the aft outward panel.

In addition to one or more of the features described above, or as an alternative, further embodiments may include that the aft portion of the inward wall is about parallel with the aft inward panel.

In addition to one or more of the features described above, or as an alternative, further embodiments may include that the aft portion of the outward wall and the aft outward panel define an outward air slot therebetween.

In addition to one or more of the features described above, or as an alternative, further embodiments may include that the aft portion of the inward wall and the aft inward panel define an inward air slot therebetween.

In addition to one or more of the features described above, or as an alternative, further embodiments may include that the outward air slot is continuous circumferentially around the combustion chamber.

In addition to one or more of the features described above, or as an alternative, further embodiments may include that the inward air slot therebetween is continuous circumferentially around the combustion chamber.

In addition to one or more of the features described above, or as an alternative, further embodiments may include that the outward air slot is intermittent circumferentially around the combustion chamber.

In addition to one or more of the features described above, or as an alternative, further embodiments may include that the inward air slot therebetween is intermittent circumferentially around the combustion chamber.

In addition to one or more of the features described above, or as an alternative, further embodiments may include that the forward panel is composed of a ceramic matrix composite.

In addition to one or more of the features described above, or as an alternative, further embodiments may include that the inward aft panel and the outward aft panel are composed of a ceramic matrix composite.

In addition to one or more of the features described above, or as an alternative, further embodiments may include that the outward wall and the outward shell define an outward air passageway therebetween, the outward air passageway being fluidly connected to the outward air slot.

In addition to one or more of the features described above, or as an alternative, further embodiments may include that the inward wall and the inward shell define an inward air passageway therebetween, the inward air passageway being fluidly connected to the inward air slot.

In addition to one or more of the features described above, or as an alternative, further embodiments may include that the outward air slot fluidly connects the outward air passageway to the combustion area.

In addition to one or more of the features described above, or as an alternative, further embodiments may include that the inward air slot fluidly connects the inward air passageway to the combustion area.

According to another embodiment, a gas turbine engine is provided. The gas turbine engine including: a combustor enclosing a combustion chamber having a combustion area, the combustor including: an outward shell; an inward shell located radially inward of the outward shell, the inward shell and the outward shell defining a combustion chamber therebetween; an aft outward panel located proximate the outward shell, the aft outward panel extending from an aft end of the combustion chamber to an outward panel joint; an aft inward panel located proximate the inward shell, the aft inward panel extending from the aft end of the combustion chamber to an inward panel joint; and a forward panel located proximate a forward end of the combustion chamber, the forward panel including: an outward wall located proximate the outward shell; an inward wall located proximate the inward shell; and a forward wall located proximate the forward end of the combustion chamber, the forward wall extending from the inward wall to the outward wall, wherein the outward wall extends from the forward wall to the outward panel joint and an aft portion of the outward wall overlaps the aft outward panel by a first distance at the outward panel joint, and wherein the inward wall extends from the forward wall to the inward panel joint and an aft portion of the inward wall overlaps the aft inward panel by a second distance at the inward panel joint.

According to another embodiment, a method of assembling a combustor is provided. The method including: inserting an inward shell radially inward of the outward shell, the inward shell and the outward shell defining a combustion chamber therebetween; inserting an aft outward panel into an aft end of the combustion chamber, the aft outward panel being located proximate the outward shell and extending from an aft end of the combustion chamber to an outward panel joint; inserting an aft inward panel into the aft end of the combustion chamber, the aft inward panel being located proximate the inward shell and extending from the aft end of the combustion chamber to an inward panel joint; inserting a forward panel into a forward end of the combustion chamber, the forward panel being located proximate the forward end of the combustion chamber, the forward panel including; an outward wall located proximate the outward shell; an inward wall located proximate the inward shell; and a forward wall located proximate the forward end of the combustion chamber, the forward wall extending from the inward wall to the outward wall, wherein the outward wall extends from the forward wall to the outward panel joint and an aft portion of the outward wall overlaps the aft outward panel by a first distance at the outward panel joint, and wherein the inward wall extends from the forward wall to the inward panel joint and an aft portion of the inward wall overlaps the aft inward panel by a second distance at the inward panel joint.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Combustors of gas turbine engines, as well as other components, experience elevated heat levels during operation. Impingement and convective cooling of heat shield panels of the combustor wall may be used to help cool the combustor. Convective cooling may be achieved by air that is channeled between the heat shield panels and a shell of the combustor. Impingement cooling may be a process of directing relatively cool air from a location exterior to the combustor toward a back or underside of the heat shield panels.

Thus, shells and heat shield panels are utilized to face the hot products of combustion within a combustion chamber and protect the overall combustor shell. The shells may be supplied with cooling air including dilution passages which deliver a high volume of cooling air into a hot flow path. The cooling air may be air from the compressor of the gas turbine engine. The cooling air may impinge upon a back side of a heat shield panel that faces a shell inside the combustor.

Figure 1:
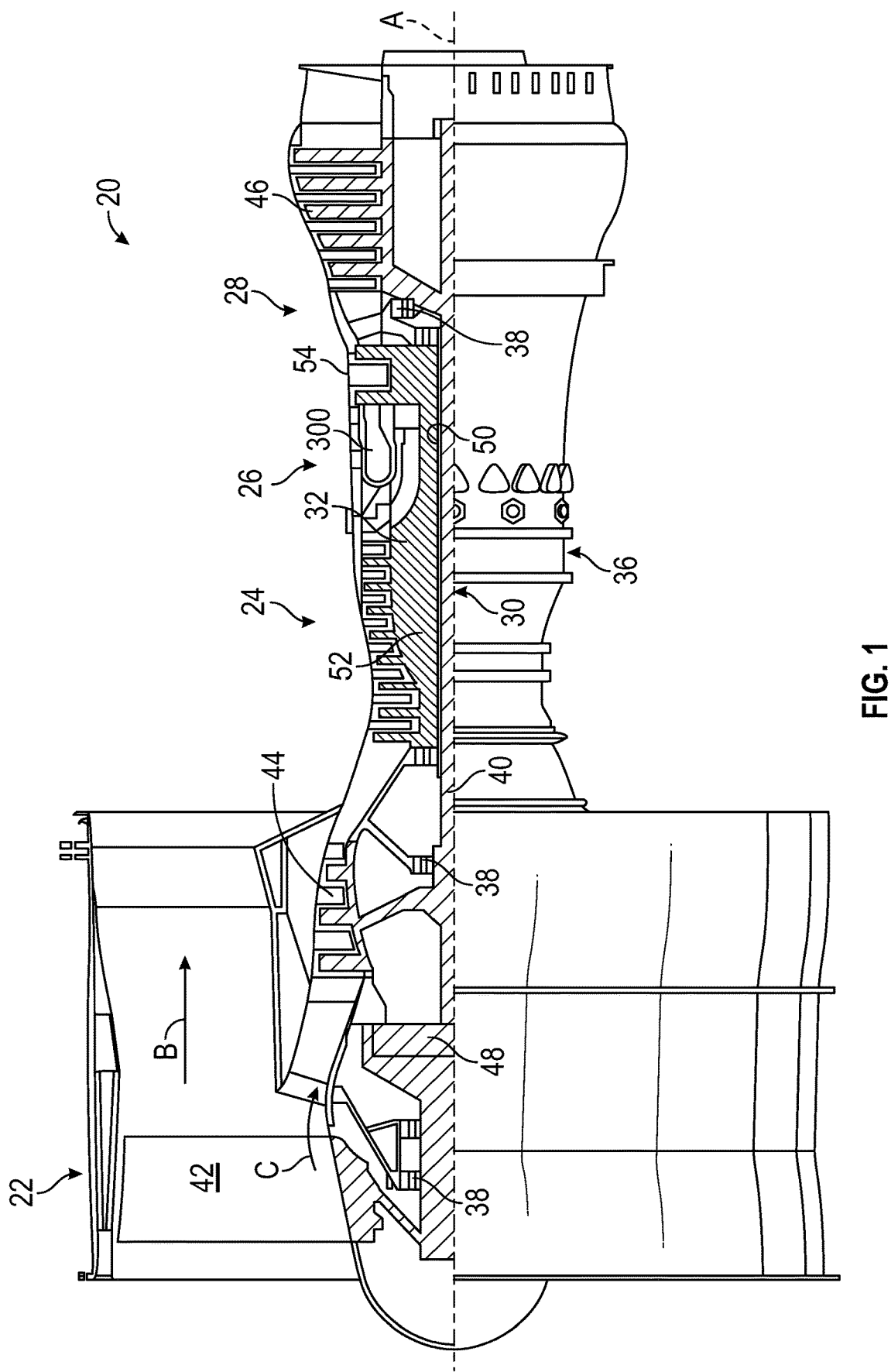
FIG. 1 is a partial cross-sectional illustration of a gas turbine engine that may incorporate embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
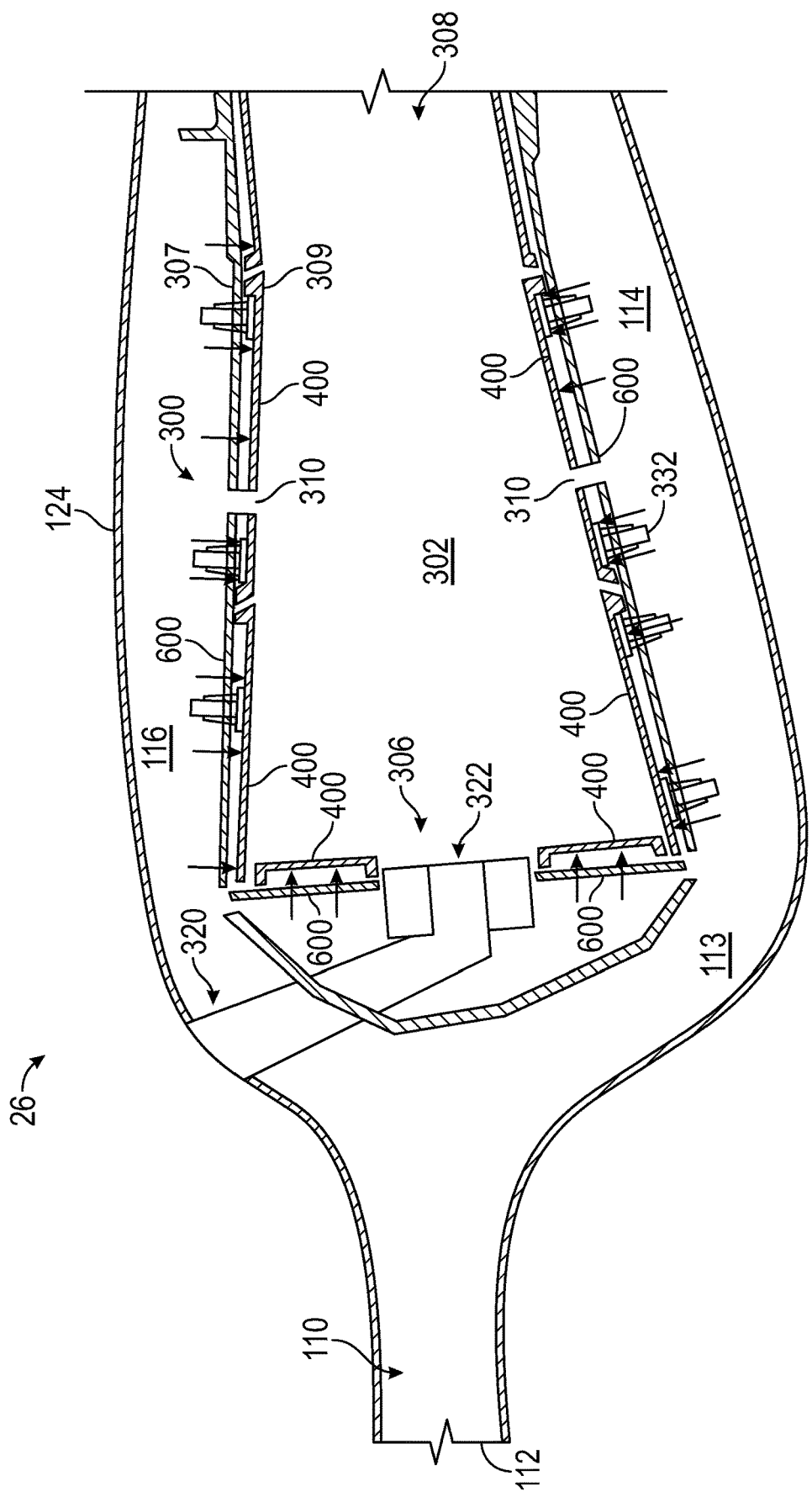
FIG. 2 is a side cross-sectional illustration of a combustor.

Referring now to FIG. 2 and with continued reference to FIG. 1, an example combustor section 26 of the gas turbine engine 20 is shown. As illustrated, a combustor 300 defines a combustion chamber 302. The combustion chamber 302 includes a combustion area 370 within the combustion chamber 302. The combustor 300 includes an inlet 306 and an outlet 308 through which air may pass. The air may be supplied to the combustor 300 by a pre-diffuser 110. Air may also enter the combustion chamber 302 through other holes in the combustor 300 including but not limited to quench holes 310, as seen in FIG. 2.

Compressor air is supplied from the compressor section 24 into a pre-diffuser strut 112. As will be appreciated by those of skill in the art, the pre-diffuser strut 112 is configured to direct the airflow into the pre-diffuser 110, which then directs the airflow toward the combustor 300. The combustor 300 and the pre-diffuser 110 are separated by a shroud chamber 113 that contains the combustor 300 and includes an inner diameter branch 114 and an outer diameter branch 116. As air enters the shroud chamber 113, a portion of the air may flow into the combustor inlet 306, a portion may flow into the inner diameter branch 114, and a portion may flow into the outer diameter branch 116.

The air from the inner diameter branch 114 and the outer diameter branch 116 may then enter the combustion chamber 302 by means of one or more impingement holes 307 in the shell 600 and one or more secondary apertures 309 in the heat shield panels 400. The impingement holes 307 and secondary apertures 309 may include nozzles, holes, etc. The air may then exit the combustion chamber 302 through the combustor outlet 308. At the same time, fuel may be supplied into the combustion chamber 302 from a fuel injector 320 and a pilot nozzle 322, which may be ignited within the combustion chamber 302. The combustor 300 of the engine combustion section 26 may be housed within a shroud case 124 which may define the shroud chamber 113.

The combustor 300, as shown in FIG. 2, includes multiple heat shield panels 400 that are attached to the shell 600. The heat shield panels 400 may be arranged parallel to the shell 600. The shell 600 can define circular or annular structures with the heat shield panels 400 being mounted on a radially inward liner and a radially outward liner, as will be appreciated by those of skill in the art. The heat shield panels 400 can be removably mounted to the shell 600 by one or more attachment mechanisms 332. In some embodiments, the attachment mechanism 332 may be integrally formed with a respective heat shield panel 400, although other configurations are possible. In some embodiments, the attachment mechanism 332 may be a bolt or other structure that may extend from the respective heat shield panel 400 through the interior surface to a receiving portion or aperture of the shell 600 such that the heat shield panel 400 may be attached to the shell 600 and held in place. The heat shield panels 400 partially enclose a combustion area 370 within the combustion chamber 302 of the combustor 300.

As shown in FIG. 2, the combustor 300 has a double wall system, where the heat shield panel 400, which can be cast from a high temperature nickel alloy, are mounted to the shell 600. This allows the shell 600 to carry a structural load as well as the majority of a pressure drop across the system, while the heat shield panels 400 are arranged to carry heat loads within the combustor 300. As such, the heat shield panels 400 can be allowed to grow thermally as heat is applied to the heat shield panels 400. In some embodiments, the heat shield panels 400 can be made of materials that have lower strength with higher oxidation resistance and melt points than the shell 600.

Figure 3:
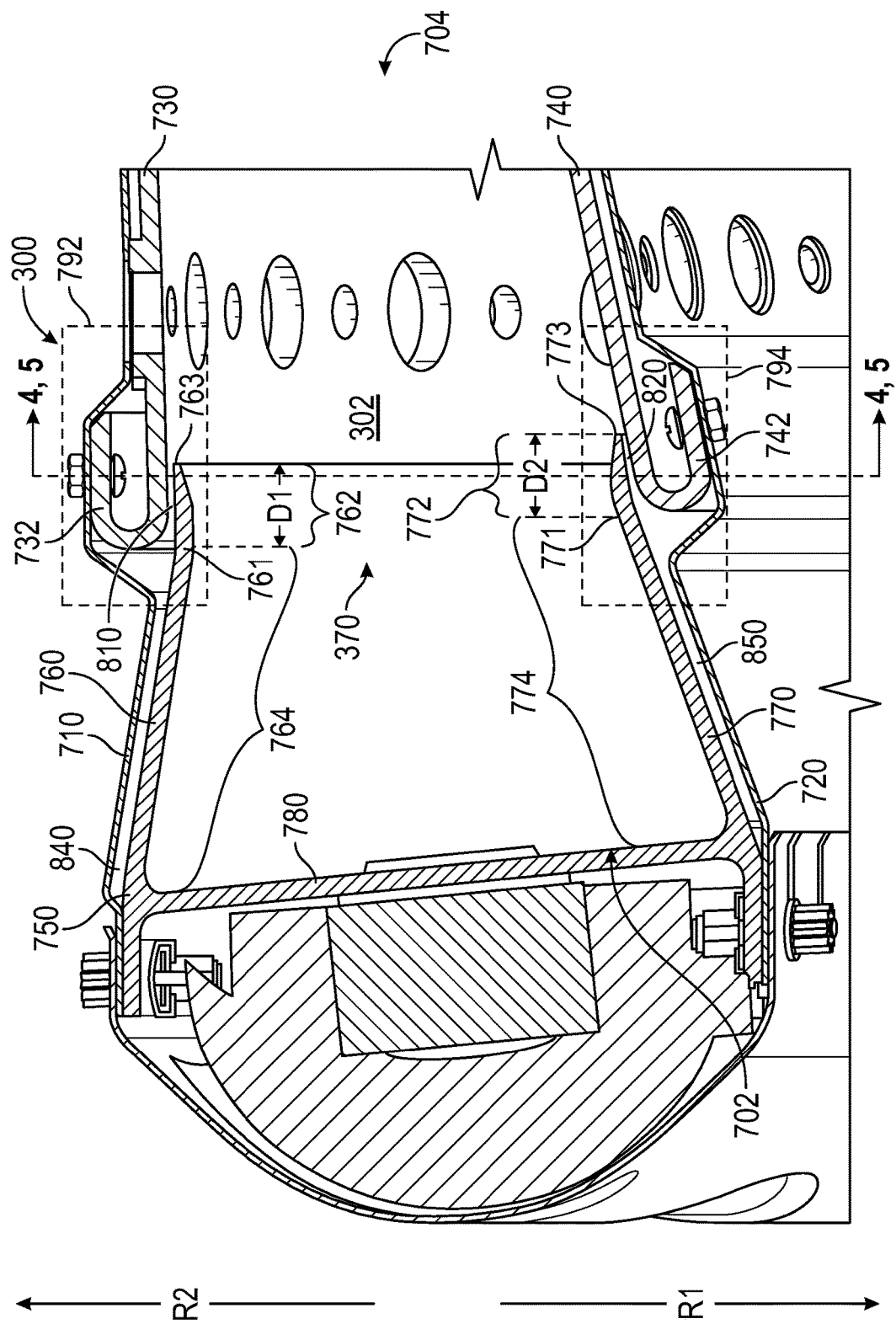
FIG. 3 is a side cross-sectional illustration of a combustor, in accordance with an embodiment of the disclosure.

In modern aircraft, it may be advantageous to increase operating pressure ratios and temperatures within combustors 300. Because of this increase in various operating parameters, traditional material selected for the heat shield panels 400 (e.g., metal) may not be sufficient, leading to early failure due to oxidation or melting. Accordingly, it may be desirable to be able to use higher temperature materials, such as ceramics, ceramic matric composites, composites, etc., in double-wall systems (e.g., as shown in FIG. 3). Higher temperature materials may be incorporated into the combustor in a single-wall or double wall solution. A double-wall combustor system can be employed using full hoop ceramic rings, which has advantages similar to metal double-wall systems. Backside impingement cooling can be used to tailor the temperatures around the ceramic rings to be relatively or substantially uniform to reduce thermal stress. Embodiments provided herein are directed to full-hoop systems with high temperature (e.g., non-ductile materials, ceramic, composite, ceramic matrix composite, etc.) panels. As defined herein, "high temperature materials"

refers to materials that are rated for temperatures at or above 1,600° F. (871° C.) and can include non-ductile materials, ceramics, composites, ceramic matrix composites, or other materials.

Figure 4:
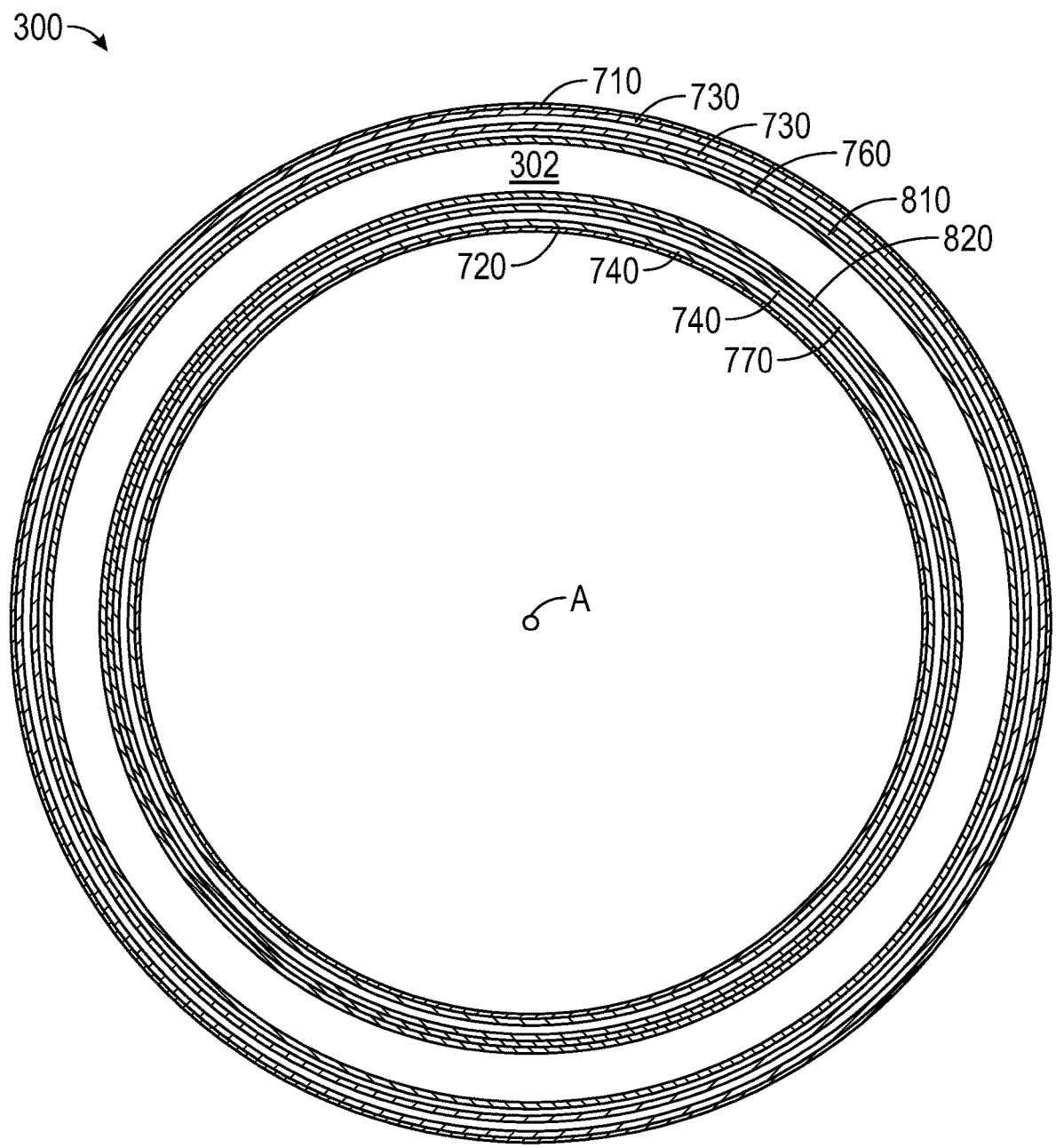
FIG. 4 is an axial cross-sectional illustration of the combustor of FIG. 3, in accordance with an embodiment of the disclosure.
Figure 5:
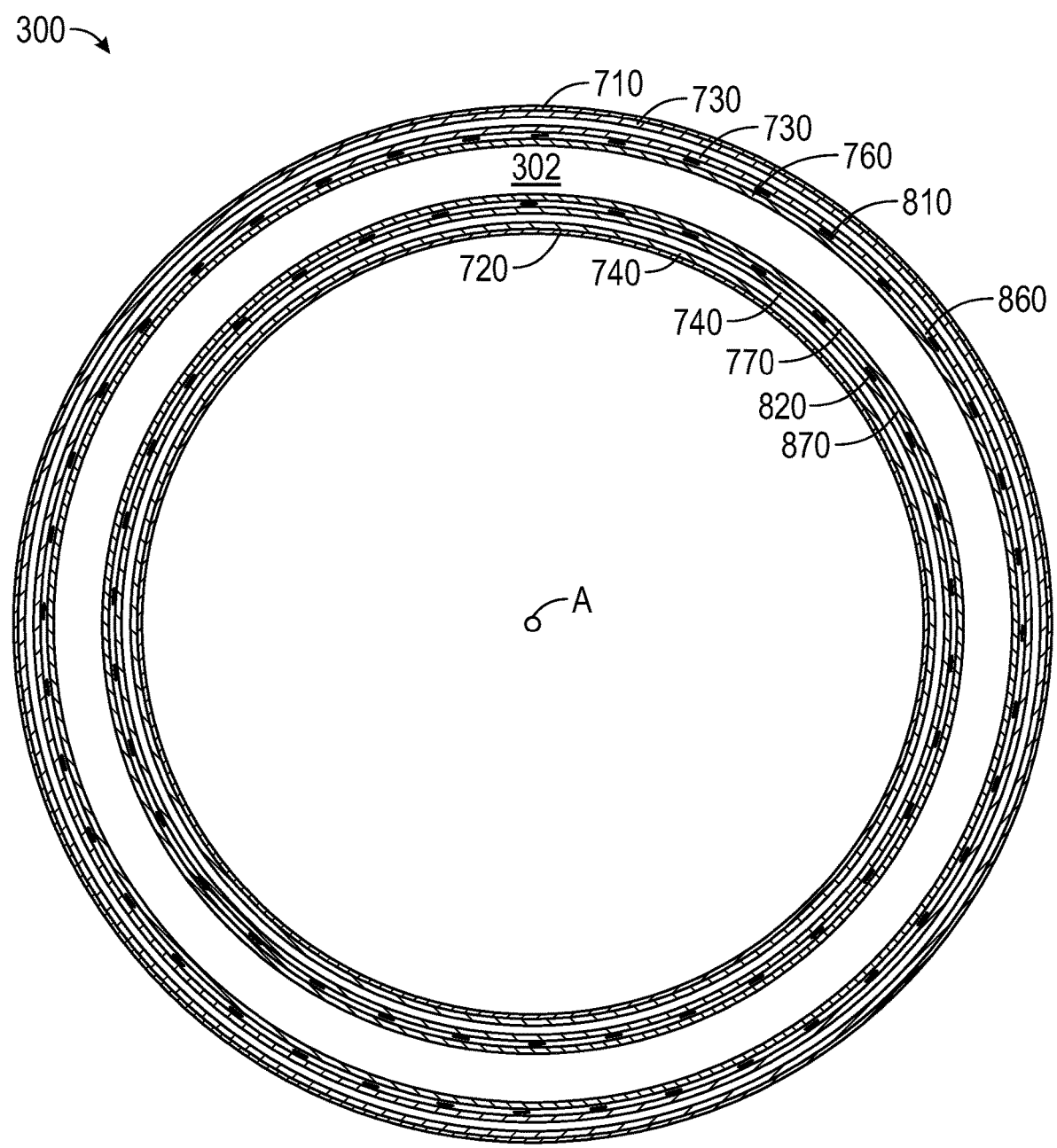
FIG. 5 is an axial cross-sectional illustration of the combustor of FIG. 3, in accordance with an embodiment of the disclosure.

Referring now to FIGS. 3, 4, and 5, with continued reference to FIGS. 1 and 2, a combustor 300 for use in a gas turbine engine 20 is illustrated in accordance with an embodiment of the disclosure. The combustor 300 encloses a combustion chamber 302 having a combustion area 370. The combustor 300 comprises: an outward shell 710, an inward shell 720, an aft outward panel 730, an aft inward panel 740, and a forward panel 750.

The inward shell 720 is located radially inward R1 of the outward shell 710. As used herein, radially inward R1 and radially outward R2 are each relative to engine central longitudinal axis A, thus radially inward R1 is towards the engine central longitudinal axis A and radially outward R2 is away from the engine central longitudinal axis A, as shown in FIG. 3. The inward shell 720 and the outward shell 710 define the combustion chamber 302 therebetween. The inward shell 720 and the outward shell 710 may be composed of a metal or metal alloy material.

The aft outward panel 730 is located proximate the outward shell 710. The aft outward panel 730 extends from an aft end 704 of the combustion chamber 302 to an outward panel joint 792. The aft outward panel 730 will be bolted to the outward shell 710. The bolts will be located between an outer fold 732 of the aft outward panel 730 and the outward shell 710. This arrangement was set to protect the bolt from the hot gas in the combustion area 302. In an embodiment, the aft outward panel 730 is composed of a high temperature material. In another embodiment, the aft outward panel 730 is composed of a ceramic matrix composite.

The aft inward panel 740 is located proximate the inward shell 720. The aft inward panel 740 extending from the aft end 704 of the combustion chamber 302 to an inward panel joint 794. The aft inward panel 740 will be bolted to the inward shell 720. The bolts will be located between an inner fold 742 of aft inward panel 740 and the inward shell 720. This arrangement was set to protect the bolt from the hot gas in area 302. In an embodiment, the aft inward panel 740 is composed of a high temperature material. In another embodiment, the aft inward panel 740 is composed of a ceramic matrix composite.

The forward panel 750 is located proximate a forward end 702 of the combustion chamber 302. The forward panel 750 partially encloses the combustion chamber 302 with the outward shell 710 and the inward shell 720. In an embodiment, the forward panel 750 is composed of a high temperature material. In another embodiment, the forward panel 750 is composed of a ceramic matrix composite. The forward panel 750 comprises an outward wall 760, an inward wall 770, and a forward wall 780. The outward wall 760, the inward wall 770, and the forward wall 780 may be integrally connected to form the forward panel 750. In an embodiment, the outward wall 760, the inward wall 770, and the forward wall 780 are formed from a single piece of material. The outward wall 760 is located proximate the outward shell 710. The inward wall 770 is located proximate the inward shell 720. The forward wall 780 is located proximate the forward end 702 of the combustion chamber 302. The forward wall 780 extends from the inward wall 770 to the outward wall 760.

The outward wall 760 extends from the forward wall 780 to the outward panel joint 792. The outward wall 760 consists of an aft portion 762 and a forward portion 764. The forward portion 764 extends from the forward wall 780 to a bend point 761 of the outward wall 760 and the aft portion 762 extends from the bend point 761 to an aft end 763 of the outward wall 760. The aft portion 762 of the outward wall 760 overlaps the aft outward panel 730 by a first distance D1 at the outward panel joint 792. In an embodiment, the first distance D1 is greater than about at least 0.300 inches (0.762 centimeters) to clear the bend radius in the aft outward panel 730 and to ensure air flow underneath the aft outward panel 730 creating the film cooling. The aft portion 762 of the outward wall 760 is located radially inward R1 from the aft outward panel 730. The aft portion 762 of the outward wall 760 is about parallel with the aft outward panel 730. The forward portion 764 of the outward wall 760 is about parallel with the outward shell 710.

The aft portion 762 of the outward wall 760 and the aft outward panel 730 define an outward air slot 810 therebetween. The outward air slot 810 may be continuous circumferentially around the combustion chamber 302 as shown in FIG. 4 or intermittent circumferentially around the combustion chamber 302 as shown in FIG. 5. As shown in FIG. 5, flow separators 860 may make the outward air slot 810 intermittent circumferentially around the combustion chamber 302. The outward wall 760 and the outward shell 710 define an outward air passageway 840 therebetween. The outward air passageway 840 is fluidly connected to the outward air slot 810. The outward air slot 810 fluidly connects the outward air passageway 840 to the combustion area 370, such that cooling airflow may be provided from the outward air passageway 840 to the combustion area 370. The cooling airflow may be directed into the combustion area 370 substantially parallel to the aft outward panel 730. Advantageously, if the outward wall 760 and the aft outward panel 730 are each composed of a material with a relatively low coefficient of thermal expansion (CMC for example), then the size of the outward air slot 810 will remain relatively consistent regardless of the temperature of the combustor 300, thus providing a consistent and predictable flow of cooling air into the combustion area 370. The outward air slot 810 may be affected by the outward shell 710 thermal growth. The size of the air slot 810 when cold will be set to ensure no interference in all operating conditions.

The inward wall 770 extends from the forward wall 780 to the inward panel joint 794. The inward wall 770 consists of an aft portion 772 and a forward portion 774. The forward portion 774 extends from the forward wall 780 to a bend point 771 of the inward wall 770 and the aft portion 772 extends from the bend point 771 to an aft end 773 of the inward wall 770. The aft portion 772 of the inward wall 770 overlaps the aft inward panel 740 by a second distance D2 at the inward panel joint 794. In an embodiment, the first distance D1 is greater than about 0.300 inches (0.762 centimeters) to clear the bend radius in the aft inward panel 740 and to ensure air flow underneath the aft inward panel 740 creating the film cooling. The aft portion 772 of the inward wall 770 is located radially outward R2 from the aft inward panel 740. The aft portion 772 of the inward wall 770 is about parallel with the aft inward panel 740. The forward portion 774 of the inward wall 770 is about parallel with the inward shell 720.

The aft portion 772 of the inward wall 770 and the aft inward panel 740 define an inward air slot 820 therebetween. The inward air slot 820 may be continuous circumferentially around the combustion chamber 302 as shown in FIG. 4 or intermittent circumferentially around the combustion chamber 302 as shown in FIG. 5. As shown in FIG. 5, flow separators 860 may make the inward air slot 820 intermittent circumferentially around the combustion chamber 302. The inward wall 770 and the inward shell 720 define an inward air passageway 850 therebetween. The inward air passageway 850 is fluidly connected to the inward air slot 820. The inward air slot 820 fluidly connects the inward air passageway 850 to the combustion area 370, such that cooling airflow may be provided from the inward air passageway 850 to the combustion area 370. The cooling airflow may be directed into the combustion area 370 substantially parallel to the aft inward panel 740. Advantageously, if the inward wall 770 and the aft inward panel 740 are each composed of a high temperature material then the size of the inward air slot 810 will remain relatively consistent regardless of the temperature of the combustor 300, thus providing a consistent and predictable flow of cooling air into the combustion area 370. The inward air slot 820 may be affected by the inward shell 720 thermal growth. The size of the inward air slot 820 when cold will be set to ensure no interference in all operating conditions.

Figure 6:
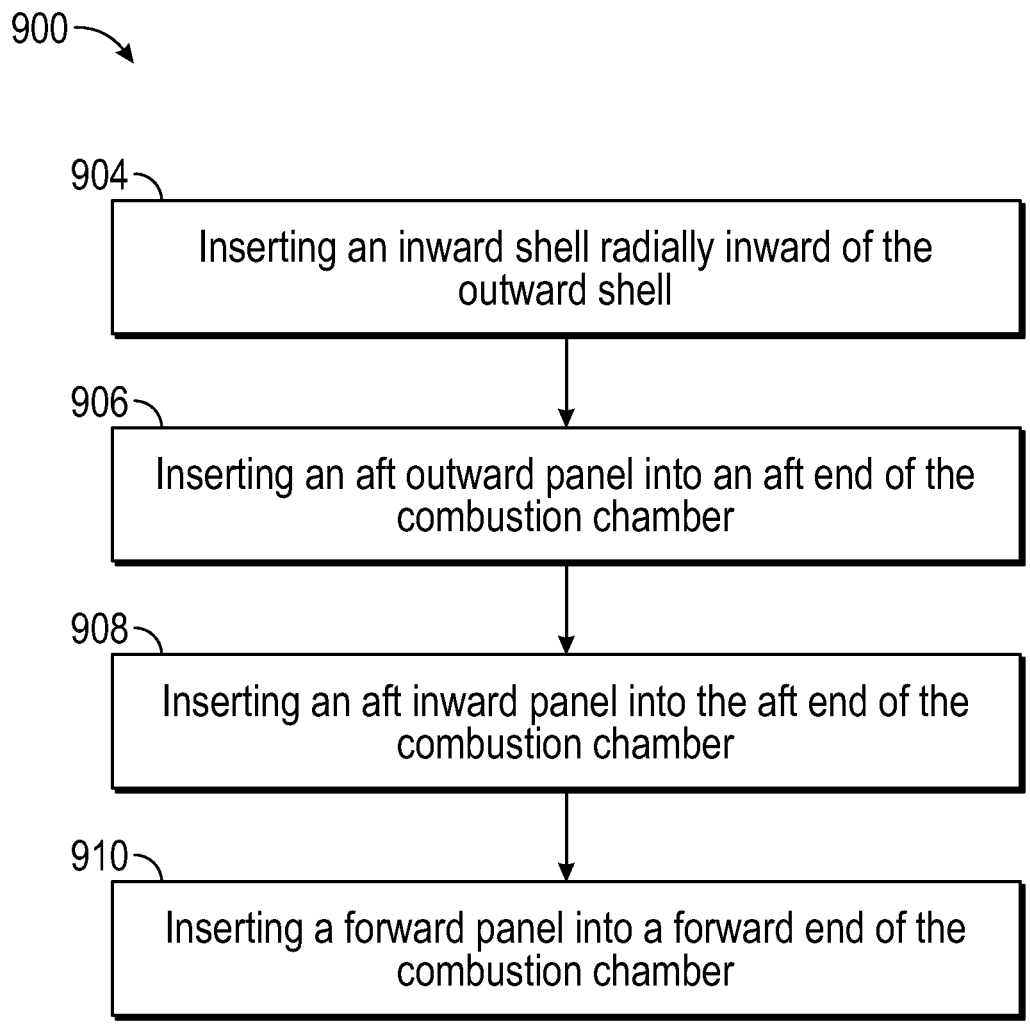
FIG. 6 is a flow chart of a method of assembling the combustor of FIG. 3, in accordance with an embodiment of the disclosure.

Referring now to FIG. 6 with continued reference to FIGS. 1-5. FIG. 6 illustrates a method 900 of assembling the combustor 300. At block 904, an inward shell 720 is inserted radially inward of the outward shell 710. The inward shell 720 and the outward shell 710 define a combustion chamber 302 therebetween. At block 906, an aft outward panel 730 is inserted into an aft end 704 of the combustion chamber 302. The aft outward panel 730 being located proximate the outward shell 710 and extending from an aft end 704 of the combustion chamber 302 to an outward panel joint 792. At block 908, an aft inward panel 740 is inserted into the aft end 704 of the combustion chamber 302. The aft inward panel 740 being located proximate the inward shell 720 and extending from the aft end 704 of the combustion chamber 302 to an inward panel joint 794. At block 910, a forward panel 750 is inserted into a forward end 702 of the combustion chamber 302. The forward panel 750 being located proximate the forward end 702 of the combustion chamber 302.

While the above description has described the flow process of FIG. 6 in a particular order, it should be appreciated that unless otherwise specifically required in the attached claims that the ordering of the steps may be varied.

Technical effects of embodiments of the present disclosure include injecting cooling air into a combustion area of a combustor using overlapping portions of a forward panel that overlap parallel with aft panels.

The term "about" is intended to include the degree of error associated with measurement of the particular quantity based upon the equipment available at the time of filing the application. For example, "about" can include a non-limiting range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A combustor for use in a gas turbine engine, the combustor enclosing a combustion chamber having a combustion area, wherein the combustor comprises:
    an outward shell;
    an inward shell located radially inward of the outward shell, the inward shell and the outward shell defining the combustion chamber therebetween;
    an aft outward panel located proximate the outward shell, the aft outward panel extending from an aft end of the combustion chamber to an outward panel joint;
    an aft inward panel located proximate the inward shell, the aft inward panel extending from the aft end of the combustion chamber to an inward panel joint; and
    a forward panel located proximate a forward end of the combustion chamber, the forward panel comprising:
    an outward wall located proximate the outward shell;
    an inward wall located proximate the inward shell; and
    a forward wall located proximate the forward end of the combustion chamber, the forward wall extending from the inward wall to the outward wall,
    wherein the outward wall extends from the forward wall to the outward panel joint and an aft portion of the outward wall overlaps the aft outward panel by a first distance at the outward panel joint,
    wherein the inward wall extends from the forward wall to the inward panel joint and an aft portion of the inward wall overlaps the aft inward panel by a second distance at the inward panel joint,
    wherein the aft outward panel includes an outer fold where the aft outward panel folds over on itself to form a first cavity, the outer fold being located at the outward panel joint where the outward wall overlaps the aft outward panel by the first distance;
    wherein a portion of the outer fold is adjacent to the outward shell;
    wherein the aft outward panel is configured to be attached to the outward shell using a first bolt that extends through the outward shell and the portion of the outer fold that is adjacent to the outward shell such that a portion of the first bolt is located in the first cavity,
    wherein the aft inward panel includes an inner fold where the aft inward panel folds over on itself to form a second cavity, the inner fold being located at the inward panel joint where the inward wall overlaps the aft inward panel by the second distance;
    wherein a portion of the inner fold is adjacent to the inward shell, and
        wherein the aft inward panel is configured to be attached to the inward shell using a second bolt that extends through the inward shell and the portion of the inner fold that is adjacent to the outward shell such that a portion of the second bolt is located in the second cavity.

2. The combustor of claim 1, wherein the aft portion of the outward wall is located radially inward from the aft outward panel.

3. The combustor of claim 1,
wherein the aft portion of the outward wall and the aft outward panel define an outward air slot therebetween, and
wherein the outward air slot is continuous or intermittent circumferentially around the combustion chamber.

4. The combustor of claim 1,
wherein the aft portion of the inward wall and the aft inward panel define an inward air slot therebetween, and
wherein the inward air slot is continuous or intermittent circumferentially around the combustion chamber.

5. The combustor of claim 1, wherein the forward panel is composed of a ceramic matrix composite.

6. The combustor of claim 1, wherein the inward aft panel and the outward aft panel are composed of a ceramic matrix composite.

7. The combustor of claim 3, wherein the outward wall and the outward shell define an outward air passageway therebetween, the outward air passageway being fluidly connected to the outward air slot.

8. The combustor of claim 4, wherein the inward wall and the inward shell define an inward air passageway therebetween, the inward air passageway being fluidly connected to the inward air slot.

9. The combustor of claim 7, wherein the outward air slot fluidly connects the outward air passageway to the combustion area.

10. The combustor of claim 8, wherein the inward air slot fluidly connects the inward air passageway to the combustion area.

11. A method of assembling a combustor, the method comprising:
inserting an inward shell radially inward of the outward shell, the inward shell and an outward shell defining a combustion chamber therebetween;
inserting an aft outward panel into an aft end of the combustion chamber, the aft outward panel being located proximate the outward shell and extending from the aft end of the combustion chamber to an outward panel joint; inserting an aft inward panel into the aft end of the combustion chamber, the aft inward panel being located proximate the inward shell and extending from the aft end of the combustion chamber to an inward panel joint;
inserting a forward panel into a forward end of the combustion chamber, the forward panel being located proximate the forward end of the combustion chamber, the forward panel comprising:
an outward wall located proximate the outward shell;
an inward wall located proximate the inward shell; and
a forward wall located proximate the forward end of the combustion chamber, the forward wall extending from the inward wall to the outward wall,
wherein the outward wall extends from the forward wall to the outward panel joint and an aft portion of the outward wall overlaps the aft outward panel by a first distance at the outward panel joint,
wherein the inward wall extends from the forward wall to the inward panel joint and an aft portion of the inward wall overlaps the aft inward panel by a second distance at the inward panel joint,
wherein the aft outward panel includes an outer fold where the aft outward panel folds over on itself to form a first cavity, the outer fold being located at the outward panel joint where the outward wall overlaps the aft outward panel by the first distance;
wherein a portion of the outer fold is adjacent to the outward shell;
wherein the aft outward panel is configured to be attached to the outward shell using a first bolt that extends through the outward shell and the portion of the outer fold that is adjacent to the outward shell such that a portion of the first bolt is located in the first cavity,
wherein the aft inward panel includes an inner fold where the aft inward panel folds over on itself to form a second cavity, the inner fold being located at the inward panel joint where the inward wall overlaps the aft inward panel by the second distance;
wherein a portion of the inner fold is adjacent to the inward shell; and
wherein the aft inward panel is configured to be attached to the inward shell using a second bolt that extends through the inward shell and the portion of the inner fold that is adjacent to the outward shell such that a portion of the second bolt is located in the second cavity;
inserting the first bolt through the outward shell and the portion of the outer fold that is adjacent to the outward shell such that the portion of the first bolt is located in the first cavity; and
inserting the second bolt through the inward shell and the portion of the inner fold that is adjacent to the inward shell such that the portion of the second bolt is located in the second cavity.

12. The combustor of claim 1, wherein the outward shell and the inward shell form an outermost shell of the combustion chamber.

13. The combustor of claim 1, a gas turbine engine comprising the combustor of claim 1.

14. The combustor of claim 1, wherein the aft portion of the outward wall and the aft outward panel define an outward air slot therebetween.

15. The combustor of claim 1, wherein the aft portion of the inward wall and the aft inward panel define an inward air slot therebetween.

16. The combustor of claim 1, wherein the aft portion of the outward wall is parallel with the aft outward panel.

17. The combustor of claim 1, wherein the aft portion of the inward wall is parallel with the aft inward panel.

18. The method of claim 11, wherein the outward shell and the inward shell form an outermost shell of the combustion chamber.

* * * * *